(12) United States Patent
Hand

(10) Patent No.: US 10,968,964 B2
(45) Date of Patent: Apr. 6, 2021

(54) COUPLING AND CONTROL ASSEMBLY HAVING AN INTERNAL LATCHING MECHANISM

(71) Applicant: Means Industries, Inc., Saginaw, MI (US)

(72) Inventor: Joshua D. Hand, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 21 days.

(21) Appl. No.: 16/589,243

(22) Filed: Oct. 1, 2019

(65) Prior Publication Data

US 2020/0109750 A1 Apr. 9, 2020

Related U.S. Application Data

(60) Provisional application No. 62/741,027, filed on Oct. 4, 2018.

(51) Int. Cl.
| | | |
|---|---|---|
| *F16D 41/12* | (2006.01) | |
| *F16D 47/04* | (2006.01) | |
| *F16D 47/02* | (2006.01) | |
| *F16D 41/14* | (2006.01) | |
| *F16D 129/06* | (2012.01) | |

(52) U.S. Cl.
CPC ........... *F16D 41/125* (2013.01); *F16D 41/14* (2013.01); *F16D 47/02* (2013.01); *F16D 47/04* (2013.01); *F16D 2129/065* (2013.01)

(58) Field of Classification Search
CPC ............................. F16D 41/125; F16D 41/14
See application file for complete search history.

(56) References Cited

U.S. PATENT DOCUMENTS

| | | |
|---|---|---|
| 4,050,560 A | 9/1977 | Torstenfelt |
| 4,340,133 A | 7/1982 | Blersch |
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,362,293 A | 11/1994 | Romanauskas |
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,918,715 A | 7/1999 | Ruth et al. |
| 5,924,510 A | 7/1999 | Itoh et al. |
| 5,927,455 A | 7/1999 | Baker et al. |
| 6,075,302 A | 6/2000 | McCleer |
| 6,193,038 B1 | 2/2001 | Scott et al. |

(Continued)

OTHER PUBLICATIONS

International Searching Authority, International Search Report and the Written Opinion of the International Searching Authority for International Application No. PCT/US2019/053968, dated Dec. 4, 2019.

*Primary Examiner* — Timothy Hannon
(74) *Attorney, Agent, or Firm* — Brooks Kushman P.C.

(57) ABSTRACT

A coupling and control assembly includes an internal latching mechanism to hold a support member and a coupling member together in position so that the support member and the second coupling member rotate together without using any energy.

44 Claims, 8 Drawing Sheets

(56) References Cited

U.S. PATENT DOCUMENTS

| | | |
|---|---|---|
| 6,244,965 B1 | 6/2001 | Klecker et al. |
| 6,290,044 B1 | 9/2001 | Burgman et al. |
| 6,503,167 B1 | 1/2003 | Sturm |
| 6,605,576 B2 | 8/2003 | Lee |
| 6,814,201 B2 | 11/2004 | Thomas |
| 6,846,257 B2 | 1/2005 | Baker et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,223,198 B2 | 5/2007 | Kimes et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Felling, Jr. et al. |
| 7,349,010 B2 | 3/2008 | Bryant et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,690,455 B2 | 4/2010 | Kano et al. |
| 7,806,795 B2 | 10/2010 | Oba et al. |
| 7,942,781 B2 | 5/2011 | Kimes |
| 9,121,454 B2 | 9/2015 | Pawley |
| 9,188,170 B2 | 11/2015 | Prout et al. |
| 2004/0110594 A1 | 6/2004 | Goto |
| 2006/0185957 A1 | 8/2006 | Kimes et al. |
| 2007/0056825 A1 | 3/2007 | Felling, Jr. et al. |
| 2007/0278061 A1 | 12/2007 | Wittkopp et al. |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0084653 A1 | 4/2009 | Holmes |
| 2009/0098968 A1 | 4/2009 | Maguire et al. |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0044141 A1 | 2/2010 | Kimes et al. |
| 2010/0071497 A1 | 3/2010 | Reisch et al. |
| 2010/0119389 A1 | 5/2010 | Lazebnik et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0140451 A1 | 6/2011 | Sharpies et al. |
| 2011/0177900 A1 | 7/2011 | Simon |
| 2011/0215575 A1 | 9/2011 | Hofbauer et al. |
| 2011/0233026 A1 | 9/2011 | Pawley |
| 2012/0145505 A1 | 6/2012 | Kimes |
| 2013/0256078 A1 | 10/2013 | Kimes et al. |
| 2014/0190785 A1 | 7/2014 | Felting et al. |
| 2015/0014116 A1 | 1/2015 | Kimes et al. |
| 2016/0131205 A1 | 5/2016 | Essenmacher |
| 2016/0377126 A1 | 12/2016 | Essenmacher |
| 2018/0003247 A1* | 1/2018 | Samie .................. F16D 28/00 |

* cited by examiner

COUPLING AND CONTROL ASSEMBLY HAVING AN INTERNAL LATCHING MECHANISM

CROSS-REFERENCE TO RELATED APPLICATIONS

This application claims the benefit of U.S. provisional application Ser. No. 62/741,027, filed Oct. 4, 2018, the disclosure of which is hereby incorporated in its entirety by reference herein.

TECHNICAL FIELD

At least one embodiment of the present invention generally relates to coupling and control assemblies, and, in particular, to such assemblies which are used with latching mechanisms to hold the assemblies in at least one position.

OVERVIEW

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer races of the one-way clutch. (Roller type is also used without springs on some applications); and Sprag type which consists of asymmetrically shaped wedges located between the inner and outer races of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs often add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2018/0347642; 2018/0038425; 2016/0369855; 2015/0014116; 2016/0377126; 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 2009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/138777; 2006/0185957; 2004/0110594; and the following U.S. Pat. Nos. 8,272,488; 8,888,637; 9,109,636; 9,188,172; 9,303,699; 9,377,061; 9,435,387; 9,441,708; 9,702,419; 9,874,252; 7,942,781; 7,806,795; 7,690,455; 7,491,151; 7,484,605; 7,464,801; 7,349,010; 7,275,628; 7,256,510; 7,223,198; 7,198,587, 7,093,512; 6,953,409; 6,846,257; 6,814,201; 6,503,167; 6,193,038; 4,050,560; 4,340,133; 5,597,057; 5,918,715; 5,638,929; 5,362,293; 5,678,668; 5,070,978; 5,052,534; 5,387,854; 5,231,265; 5,394,321; 5,206,573; 5,453,598; 5,642,009; 6,075,302; 6,605,576; 6,982,502; 7,153,228; 5,924,510; 5,918,715; 9,121,454; and 9,188,170.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three-dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

In electromagnetism, permeability is the measure of the ability of a material to support the formation of a magnetic field within itself, otherwise known as distributed inductance in transmission line theory. Hence, it is the degree of magnetization that a material obtains in response to an applied magnetic field.

Relative permeability is the ratio of permeability of a specific medium to the permeability of free space. Relative permeability of any material at a sufficiently high field strength trends toward 1 (at magnetic saturation).

Iron, nickel, cobalt and some of the rare earths (gadolinium, dysprosium) exhibit a unique magnetic behavior which is called ferromagnetism because iron (ferrum in Latin) is the most common and most dramatic example. Samarium and neodymium in alloys with cobalt have been used to fabricate very strong rare-earth magnets.

In ferromagnetic materials the permeability may be very large and it is convenient to characterize the materials by a relative permeability.

Some representative relative permeabilities at a magnetic flux density of 0.002 W/m$^2$:

| Material | Relative Permeability |
| --- | --- |
| Magnetic iron | 200 |
| Nickel | 100 |
| Permalloy | 8,000 |
| (78.5% nickel, 21.5% iron) | |
| Mumetal | 20,000 |
| (75% nickel, 2% chromium, 5% copper, 18% iron) | |

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

Latches are often used with one-way clutches to hold the clutch in either an "on" or an "off" position using hydraulics, pneumatics, mechanics or electrical energy. Such latches are typically contained within the actuation system of the clutch. This presents a problem for dynamically controlled clutches because such actuation systems do not like to be rotated and, consequently, tend to be external to the clutch.

SUMMARY OF EXAMPLE EMBODIMENTS OF THE INVENTION

An object of at least one embodiment of the present invention is to provide a coupling and control assembly having an internal latching mechanism to allow for lower energy usage and, consequently, better vehicle effectiveness, less damage/wear to components of the assembly and better NVH (i.e. noise, vibrations and harshness).

In carrying out the above object and other objects of at least one embodiment of the present invention, a coupling and control assembly is provided. The assembly includes first and second coupling members supported for rotation relative to one another about a common rotational axis. The first and second coupling members include coupling first and second faces, respectively, in close-spaced opposition with one another. The second coupling member has a third face spaced from the second face. The second face has a pocket. The first face has a set of locking formations and the third face has a passage in communication with the pocket. A locking member is received within the pocket in an uncoupling position and pivots outwardly from the pocket to a coupling position in engagement with one of the locking formations. The locking member controls the operating mode of the coupling assembly. The passage communicates an actuating force to actuate the locking member within the pocket so that the locking member moves between the coupling and uncoupling positions. An actuator is received within the passage to provide the actuating force. A support member supports the actuator and is mounted for controlled shifting movement relative to the second coupling member between a first position that corresponds to a first mode of the assembly and a second position which corresponds to a second mode of the assembly. A latching mechanism holds the support member and the second coupling member together in the second position so that the support member and the second coupling member rotate together without using any energy.

The assembly may further include at least one biasing member which exerts a biasing force on the support member wherein a control force is applied to the support member to cause the support member to move from its first position to its second position against the biasing force of the at least one biasing member. The absence of the control force may cause the at least one biasing member to move the support member from its second position back to its first position.

The latching mechanism may be a permanent magnet latching mechanism located between the second coupling member and the support member.

The first and third faces may be oriented to face axially in a first direction along the rotational axis and the second face may be oriented to face axially in a second direction opposite the first direction along the rotational axis.

The locking member may be a locking strut which prevents relative rotation of the first and second coupling members with respect to each other in at least one direction about the rotational axis.

The assembly may further include a biasing member that biases the locking member against pivotal motion of the locking member towards the coupling position wherein the actuating force pivots the locking member against the bias of the biasing member.

The first, second and third faces may be generally annular and generally extend radially with respect to the rotational axis.

The locking member may be seesaw-shaped.

The actuator may be a spring actuator.

The support member may be an apply plate, the first coupling member may be a notch plate and the second coupling member may be a pocket plate.

Further in carrying out the above object and other objects of at least one embodiment of the present invention, a coupling and control assembly is provided. First and second coupling members are supported for rotation relative to one another about a common rotational axis. The first and second coupling members including coupling first and second faces, respectively, in close-spaced opposition with one another. The second coupling member has a third face spaced from the second face. The second face having a plurality of pockets, the first face has a set of locking formations and the third face has a plurality of passages in communication with their respective pockets. A locking member is received within each of the pockets in an uncoupling position and pivoting outwardly from its respective pocket to a coupling position in engagement with one of the locking formations. The locking members control the operating mode of the coupling assembly. The passages communicate actuating forces to actuate their respective locking members within the pockets so that the locking members move between their coupling and the uncoupling positions. An actuator is received within each of the passages to provide the actuating forces. A support member supports the actuators and is mounted for controlled shifting movement relative to the second coupling member between a first position that corresponds to a first mode of the assembly and a second position which corresponds to a second mode of the assembly. A latching mechanism holds the support member and the second coupling member together in the second position so that the support member and the second coupling member rotate together without using any energy.

The assembly may further include a plurality of biasing members that exert biasing forces on the support member wherein a control force is applied to the support member to cause the support member to move from its first position to its second position against the biasing forces of the biasing members and wherein, in the absence of the control force, the biasing members may move the support member from its second position back to its first position.

The latching mechanism may be a permanent magnet latching mechanism located between the second coupling member and the support member.

The first and third faces may be oriented to face axially in a first direction along the rotational axis and the second face may be oriented to face axially in a second direction opposite the first direction along the rotational axis.

Each locking member may be a locking strut which prevents relative rotation of the first and second coupling members with respect to each other in at least one direction about the rotational axis.

The assembly may further include a plurality of biasing members that bias the locking members against the pivotal motion of the locking members towards their coupling positions wherein the actuating forces pivot the locking members against the bias of the biasing members.

The first, second and third faces may be generally annular and generally extend radially with respect to the rotational axis.

The locking members may be seesaw-shaped.

The actuator may be spring actuators.

The support member may be an apply plate, the first coupling member may be a notch plate and the second coupling member may be a pocket plate.

The latching mechanism may hold the support member in the first position.

The latching mechanism may be located between the second coupling member and the support member.

The latching mechanism may be a magnetic latching mechanism.

The magnetic latching mechanism may include a first set of permanent magnets supported on the support member to move therewith and a second set of permanent magnets supported on the second coupling members to move therewith. The first and second sets of magnets may hold the support member and the second coupling member together in the second position.

The locking mechanism may include a set of permanent magnets wherein at least portions of the second coupling member may have a relative magnetic permeability greater than 1. The set of magnets and the portions of the second coupling member may hold the support member and the second coupling member together in the second position.

The assembly may further comprise a generally round retaining structure that is received by an annular groove in one of the coupling members to retain the assembly together while allowing the shifting movement of the support member. At least portions of the retaining structure may have a relative magnetic permeability greater than 1. The set of magnets and the portions of the retaining structure may hold the retaining structure and the second coupling member together in the first position.

The retaining structure may comprise a snap ring.

The at least one portion of the second coupling member may comprise one or more ferromagnetic materials.

The at least one portion of the second coupling member may comprise one or more ferromagnetic materials wherein the at least one portion of the second coupling member may comprise one or more soft magnetic sintered materials.

The relative magnetic permeability may be greater than 10.

The relative magnetic permeability may be greater than about 100.

The relative magnetic permeability may be greater than about 1,000.

The relative magnetic permeability may be greater than about 10,000.

The first and third faces may be oriented to face axially in a first direction along the rotational axis and the second face may be oriented to face axially in a second direction opposite the first direction along the rotational axis.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
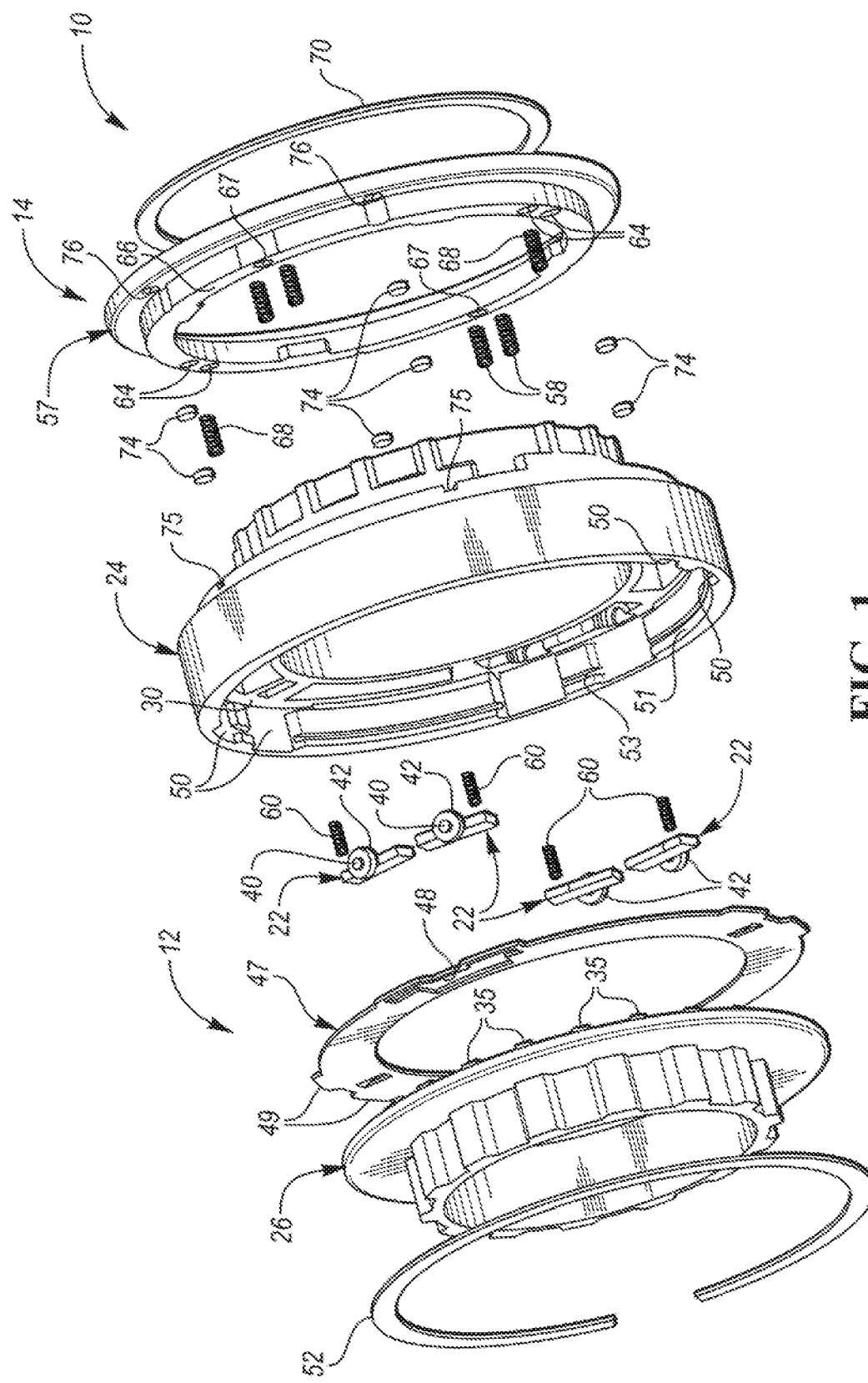
FIG. 1 is an exploded perspective view of a coupling and control assembly constructed in accordance with at least one embodiment of the present invention.
Figure 2:
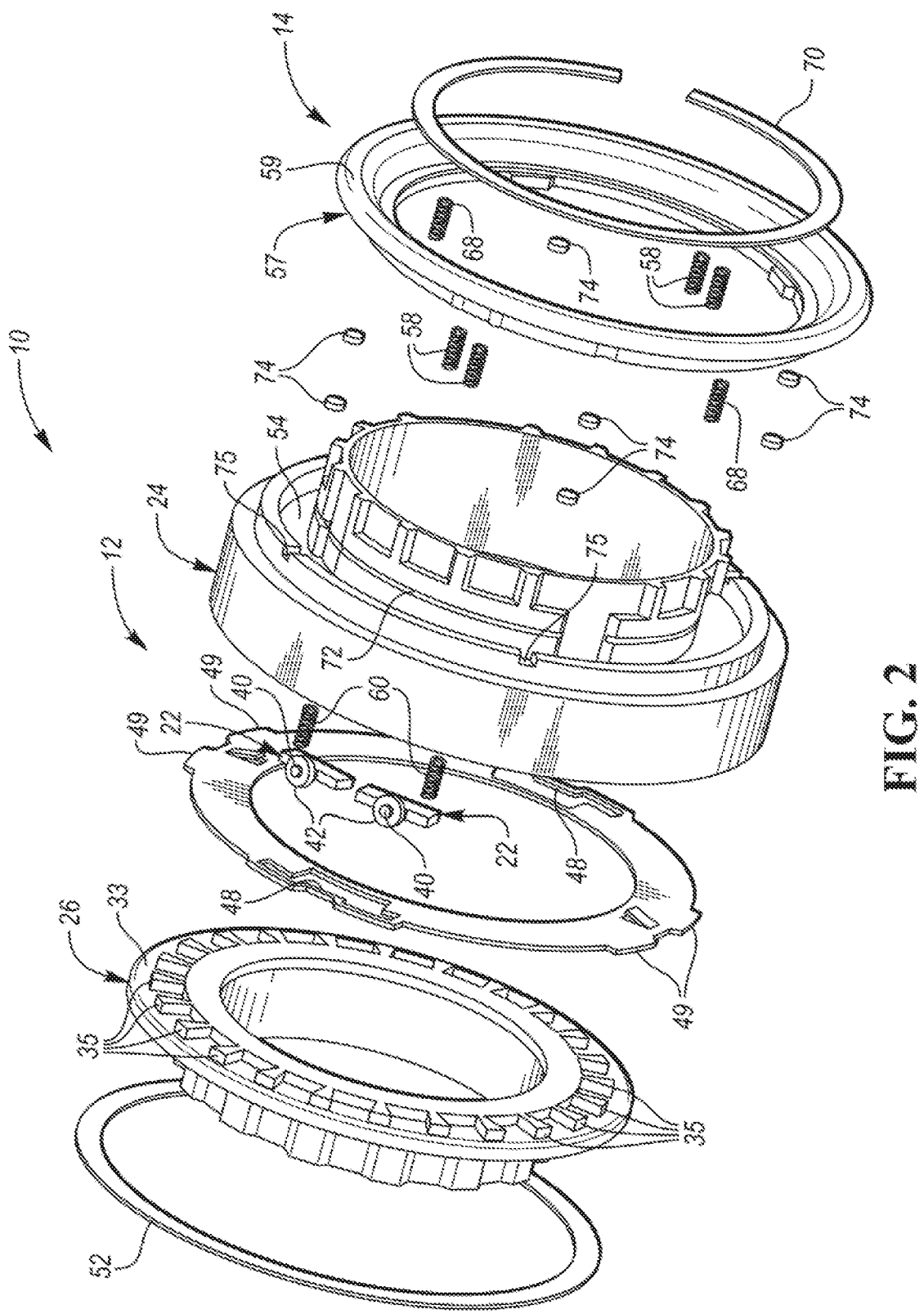
FIG. 2 is an exploded perspective view of the assembly of FIG. 1 taken from the side opposite the side of FIG. 1.

Referring now to FIGS. 1 and 2, there is illustrated a coupling and control assembly, generally indicated at 10, constructed in accordance with at least one embodiment of the present invention. The assembly 10 includes a coupling subassembly, generally indicated at 12, and a control subassembly, generally indicated at 14. The coupling subassembly 12 includes one or more seesaw-shaped, locking members or struts, generally indicated at 22. The locking members 22 controllably transmit torque between first and second clutch or coupling members, generally indicated at 24 and 26, respectively, of the coupling subassembly 12.

The first coupling member 24 may be a pocket plate which can rotate in either a clockwise direction or a counterclockwise direction about a rotational axis 28 (FIG. 4) of the assembly 10 and includes a generally flat, annular coupling face 30 having a plurality of pockets, generally indicated at 32 (in FIG. 3), each one of which is sized and shaped to receive and nominally retain a locking member such as the teeter-totter strut 22. The pockets 32 are spaced about the axis 28 of the assembly 10. The face 30 is oriented to face axially in a first direction along the rotational axis 28 of the assembly 10.

The second clutch member 26 may be a notch plate and has a generally flat, annular coupling second face 33 opposed to the first face 30 and oriented to face axially in a second direction opposite the first direction along the rotational axis 28 of the assembly 10. The second face 33 has a plurality of locking formations 35 that are engaged by the locking members 22 upon projection or pivoting from their respective pockets 32 to prevent relative rotation of the first and second members 24 and 26 with respect to each other in at least one direction about the axis 28 of the assembly 10.

Each locking member 22 includes a member-engaging first end surface 34, a member-engaging second end surface 36, and an elongated main body portion 38 between the end surfaces 34 and 36. The locking member 22 also includes a projecting outer pivot 40 which extends laterally from the main body portion 38 for enabling pivotal motion of the locking member 22 about a pivot axis of the locking member 22 which intersects the pivot 40. The end surfaces 34 and 36 of the locking member 22 are movable between engaged and disengaged positions between the members 24 and 26 during the pivotal motion whereby one-way torque transfer may occur between the coupling members 24 and 26 in the engaged positions of the locking members 22.

A bearing such as a roller bearing 42 may support each of the pivots 40 adjacent the outer wall of each of the pockets 32. A preferred locking member or strut 22 with its bearing 42 is shown in detail in corresponding patent application entitled "High-Speed Overrunning Coupling and Control Assembly, Coupling Assembly and Locking Member Which Pivotally Moves with Substantially Reduced Friction" filed on Jul. 22, 2019 and having U.S. Ser. No. 16/518,371 and which is incorporated in its entirety by reference herein.

The assembly 10 also includes an apertured retainer element or cover plate, generally indicated at 47, supported between the first and second clutch members 24 and 26, respectively. The retainer element 47 has a plurality of spaced openings 48 extending completely therethrough to allow the locking members or struts 22 to extend therethrough and lock the first and second clutch members 24 and 26, respectively, together. The upper surfaces of the body portions 38 pivot against the lower surface of the retainer plate 47 during such movement.

The cover plate 47 is prevented from rotating relative to the pocket plate 24 by shoulders 49 circumferentially spaced about the outer periphery of the cover plate 47 and which fit within corresponding apertures 50 formed in an inner axial surface 51 of the pocket plate 24.

A snap ring 52 is disposed within a groove 53 formed in the inner axial surface 51 of the pocket plate 24 to retain the notch plate 26, the pocket plate 24 and the cover plate 47 together.

The locking member 22 may be an injection molded locking member such as a metal injection molded locking member or part.

The first coupling member 24 also has a face 54 (FIG. 2) opposite the first face 30 having a plurality of passages 56 (FIG. 3) spaced about the rotational axis 28 of the assembly 10. Each passage 56 is in communication with its pocket 32. The passages 56 communicate actuating forces to their respective locking members 22 within their respective pockets 32. The first face 30 and the opposite face 54 are generally annular and extend generally radially with respect to the rotational axis 28 of the assembly 10.

Actuators, such as spring actuators, including a spring actuator 58, may be received within the passages 56 to provide the actuating forces to actuate the locking members 22 within their respective pockets 32 so that the locking members 22 move between their engaged and disengaged positions. Other types of actuators such as pins may be used to provide the actuating forces.

An actuator or apply plate, generally indicated at 57, of the assembly 10 is operatively connected to the spring actuators 58 to linearly move the spring actuators 58 in unison. The apply plate 57 moves upon receiving a pressure or actuating force on a working face 59 (FIG. 2) of the plate 57 to linearly move the spring actuators 58 within the passages 56.

Biasing members such as coiled return springs 60 bias the locking members 22 against pivotal motion of the locking members 22 towards their engaged positions. The spring actuators 58 pivot their locking members 22 against the bias of the spring biasing members 60. Each pocket 32 has an inner recess 62 (FIG. 3) for receiving its respective biasing spring 60 wherein each pocket 32 is a spring pocket.

The apply plate 57 has a plurality of spaced apertures 64 formed on its inner end face or surface 66 to operatively connect the springs 58 to the plate 57. The plate 57 also supports a plurality of biasing coil springs 68 which extend between the apertures (not shown) formed in the end face or surface 54 of the plate 24 and apertures 67 formed in the face 66 of the apply plate 57 to bias the apply plate 57 and the pocket plate 24 apart.

The assembly 10 also includes a snap ring 70 which is disposed in a groove 72 formed in an axial surface 14 of the pocket plate 24 to hold the plate 57 within the pocket plate 24.

The assembly 10 also includes a permanent magnet latch mechanism to either hold the assembly 10 in its "on" position or its "off" position without using any energy. The latch mechanism is external to the actuation system. The latch mechanism includes relatively small, cheap button magnets 74 inserted within apertures 75 of the pocket plate 24 and apertures 76 in the apply plate 57 which thereby provide a permanent magnetic latch between the two plates 24 and 57. When held together by the magnets 74, the apply plate 57 rotates with the pocket plate 24 (i.e. no relative rotation). In this way, a magnetic latch is provided on one side of actuation and a spring latch is provided on the other side of actuation (or both sides of actuation would have a magnetic latch). Preferably, the opposing magnets 74 are in physical contact with one another in the latch state (i.e. when the magnetic latch has its greatest strength).

The magnetic latch mechanism of the assembly 10 allows for lower energy usage which means better vehicle efficiencies, less damage/wear to the components and better NVH (i.e. noise, vibration, and harshness). The button magnets 74 are relatively cheap.

Referring now to FIGS. 8-11, there is illustrated a second embodiment of a coupling and control assembly, generally indicated at 110, constructed in accordance with at least one embodiment of the present invention. Parts or components of the second embodiment which are the same or similar in either structure or function to the parts or components of the first embodiment have the same reference number preceded by the number "1."

The assembly 110 includes a coupling subassembly, generally indicated at 112, and a control subassembly, generally indicated at 114. The coupling subassembly 112 includes one or more seesaw-shaped, locking members or struts, generally indicated at 122. The locking members 122 controllably transmit torque between first and second clutch or coupling members, generally indicated at 124 and 126, respectively, of the coupling subassembly 112.

The first coupling member 124 may be a pocket plate which can rotate in either a clockwise direction or a counter-clockwise direction about a rotational axis 128 (FIG. 11) of the assembly 110 and includes a generally flat, annular coupling face 130 having a plurality of pockets, generally indicated at 132 (in FIG. 11), each one of which is sized and shaped to receive and nominally retain a locking member such as the teeter-totter strut 122. The pockets 132 are spaced about the axis 128 of the assembly 110. The face 130 is oriented to face axially in a first direction along the rotational axis 128 of the assembly 110.

The second clutch member 126 may be a notch plate and has a generally flat, annular coupling second face 133 (FIGS. 8 and 9) opposed to the first face 130 and oriented to face axially in a second direction opposite the first direction along the rotational axis 128 of the assembly 110. The second face 133 has a plurality of locking formations 135 (FIG. 11) that are engaged by the locking members 122 upon projection or pivoting from their respective pockets 132 to prevent relative rotation of the first and second members 124 and 126 with respect to each other in at least one direction about the axis 128 of the assembly 110.

As in the first embodiment, each locking member 122 includes a member-engaging first end surface, a member-engaging second end surface, and an elongated main body portion between the end surfaces. Each locking member 122 also includes a projecting outer pivot which extends laterally from its main body portion for enabling pivotal motion of the locking member 122 about a pivot axis of the locking member 122 which intersects the pivot. The end surfaces of the locking member 122 are movable between engaged and disengaged positions between the members 124 and 126 during the pivotal motion whereby one-way torque transfer may occur between the coupling members 124 and 126 in the engaged positions of the locking members 122.

A bearing such as a roller bearing may support each of the pivots adjacent the outer wall of each of the pockets 132. A preferred locking member or strut 122 with its bearing is shown in detail in corresponding patent application entitled "High-Speed Overrunning Coupling and Control Assembly, Coupling Assembly and Locking Member Which Pivotally Moves with Substantially Reduced Friction" filed on Jul. 22, 2019, with U.S. Ser. No. 16/518,371 and which is incorporated in its entirety by reference herein.

The assembly 110 also includes an apertured retainer element or cover plate, generally indicated at 147, supported between the first and second clutch members 124 and 126, respectively. The retainer element 147 has a plurality of spaced openings 148 extending completely therethrough to allow the locking members or struts 122 to extend therethrough and lock the first and second clutch members 124 and 126, respectively, together. The upper surfaces of the body portions pivot against the lower surface of the retainer plate 147 during such movement.

The cover plate 147 is prevented from rotating relative to the pocket plate 124 by shoulders 149 circumferentially spaced about the outer periphery of the cover plate 147 and which fit within corresponding apertures 150 formed in an inner axial surface 151 of the pocket plate 124.

A snap ring 152 is disposed within a groove 153 formed in the inner axial surface 151 of the pocket plate 124 (FIGS. 8 and 9) to retain the notch plate 126, the pocket plate 124 and the cover plate 147 together.

The locking member 122 may be an injection molded locking member such as a metal injection molded locking member or part. In like fashion, the pocket plate 124 as well as the notch plate 126 may be metal injection molded.

The first coupling member 124 also has a face 154 (FIGS. 8 and 9) opposite its first face 130 having a plurality of passages (not shown but similar to the passages 56 of the first embodiment) spaced about the rotational axis 128 of the assembly 110. Each passage is in communication with its pocket 132. The passages communicate actuating forces to their respective locking members 122 within their respective pockets 132. The first face 130 and the opposite face 154 are generally annular and extend generally radially with respect to the rotational axis 128 of the assembly 110.

Figure 3:
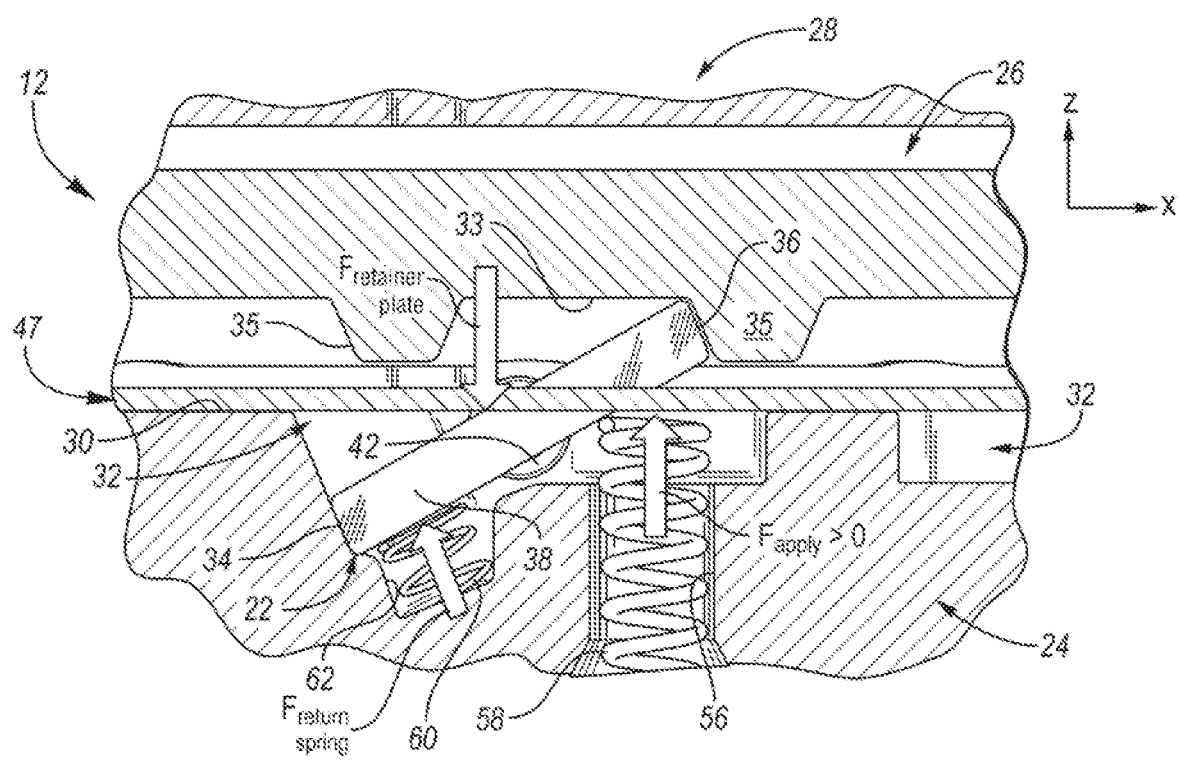
FIG. 3 is a view, partially broken away and in cross-section, of pocket, retainer and notch plates with a locking member or strut extending through the retainer plate to lock the assembly in its coupling mode.
Figure 4:
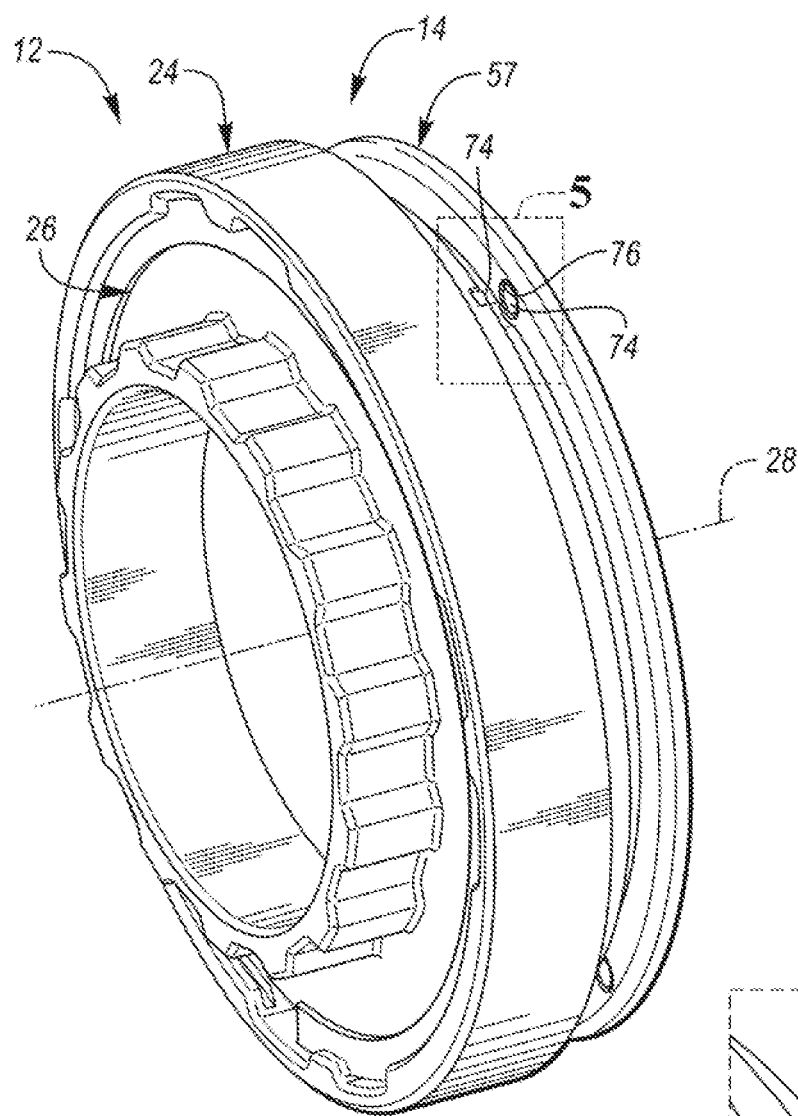
FIG. 4 is a perspective view of the assembly of FIGS. 1 and 2 in its assembled condition.
Figure 5:
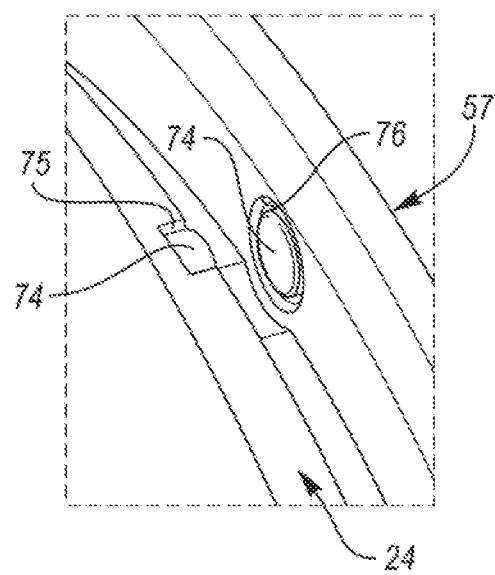
FIG. 5 is an enlarged view of a portion of the view of FIG. 4 taken within the dashed rectangle of FIG. 4.
Figure 6:
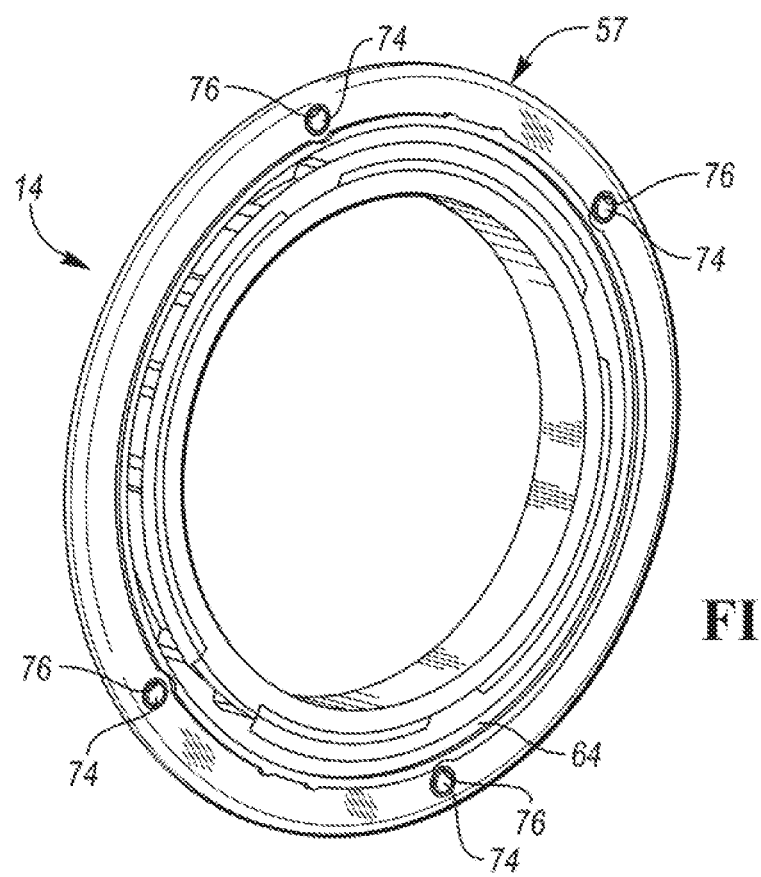
FIG. 6 is a perspective end view of the apply plate or support member and which particularly shows the locations of button magnets of a magnetic latching mechanism supported on the apply plate.
Figure 7:
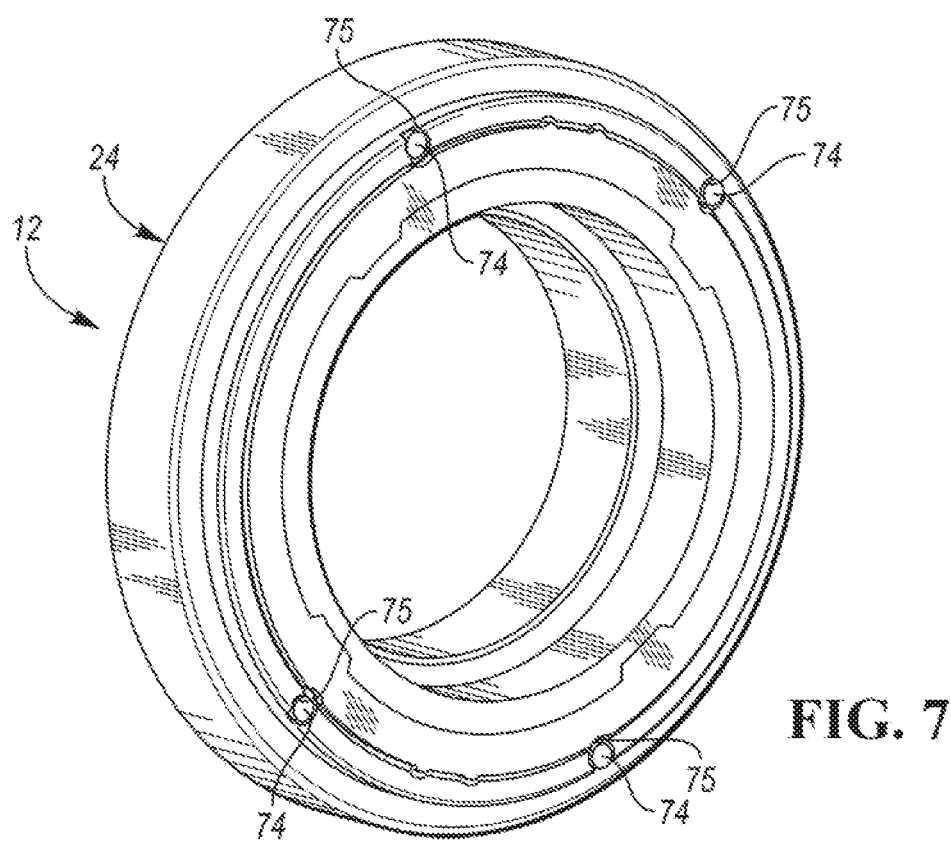
FIG. 7 is perspective end view of a face of the pocket plate and which shows the corresponding locations of latching button magnets of the magnetic latching mechanism therein.

Actuators, such as spring actuators 158, may be received within the passages (similar to what is shown in FIG. 3) to provide the actuating forces to actuate the locking members 122 within their respective pockets 132 so that the locking members 122 move between their engaged and disengaged positions. Other types of actuators such as pins may be used to provide the actuating forces.

A translator structure or support member, generally indicated at 157, of the assembly 110 is operatively connected to the spring actuators 158 to linearly move the spring actuators 158 in unison. The support member 157 moves upon receiving a pressure or actuating force from an actuation system on a working face 159 (FIGS. 8 and 9) of the support member 157 to linearly move the spring actuators 158 within their passages. The actuation system may be most any kind of actuation system such as a shift fork, linear actuator (magnetic forces) or manual.

As described in the above-noted co-pending application, biasing members such as return springs bias the locking members 122 against pivotal motion of the locking members 122 towards their engaged positions. The spring actuators 158 pivot their locking members 122 against the bias of the biasing members. Each pocket 132 has an inner recess for receiving its respective biasing spring wherein each pocket 132 is a spring pocket.

Figure 8:
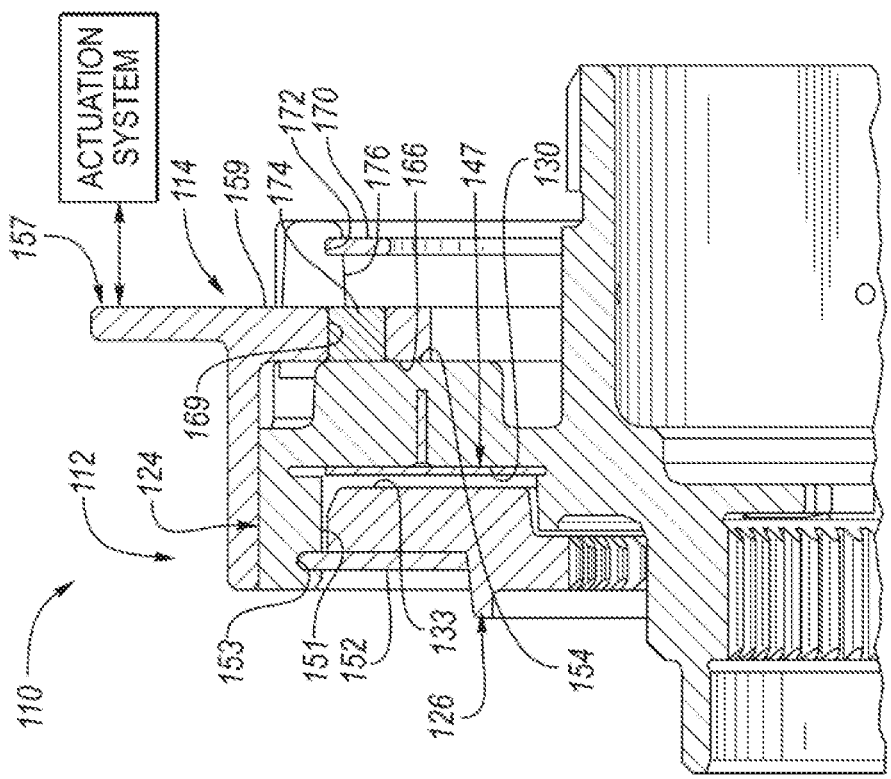
FIG. 8 is a view, partially broken away and in cross-section, of a second embodiment of a coupling and control assembly with a support member or translator structure in a latched position which corresponds to an operating mode of the assembly in which the locking members are in their coupling positions.
Figure 10:
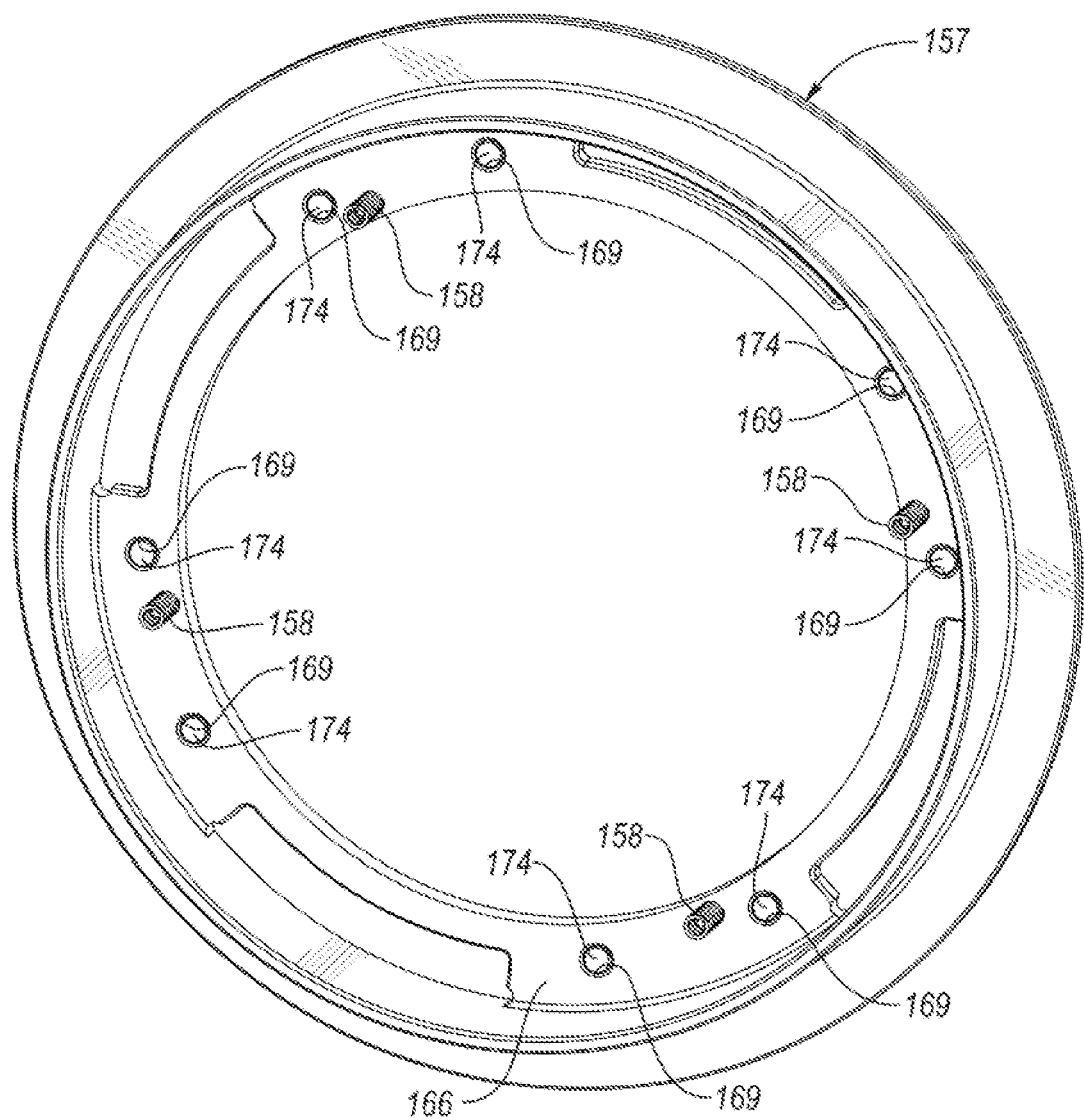
FIG. 10 is a side perspective schematic view of the support member of the second embodiment together with a plurality of circumferentially-spaced button magnets and spring actuators.
Figure 11:
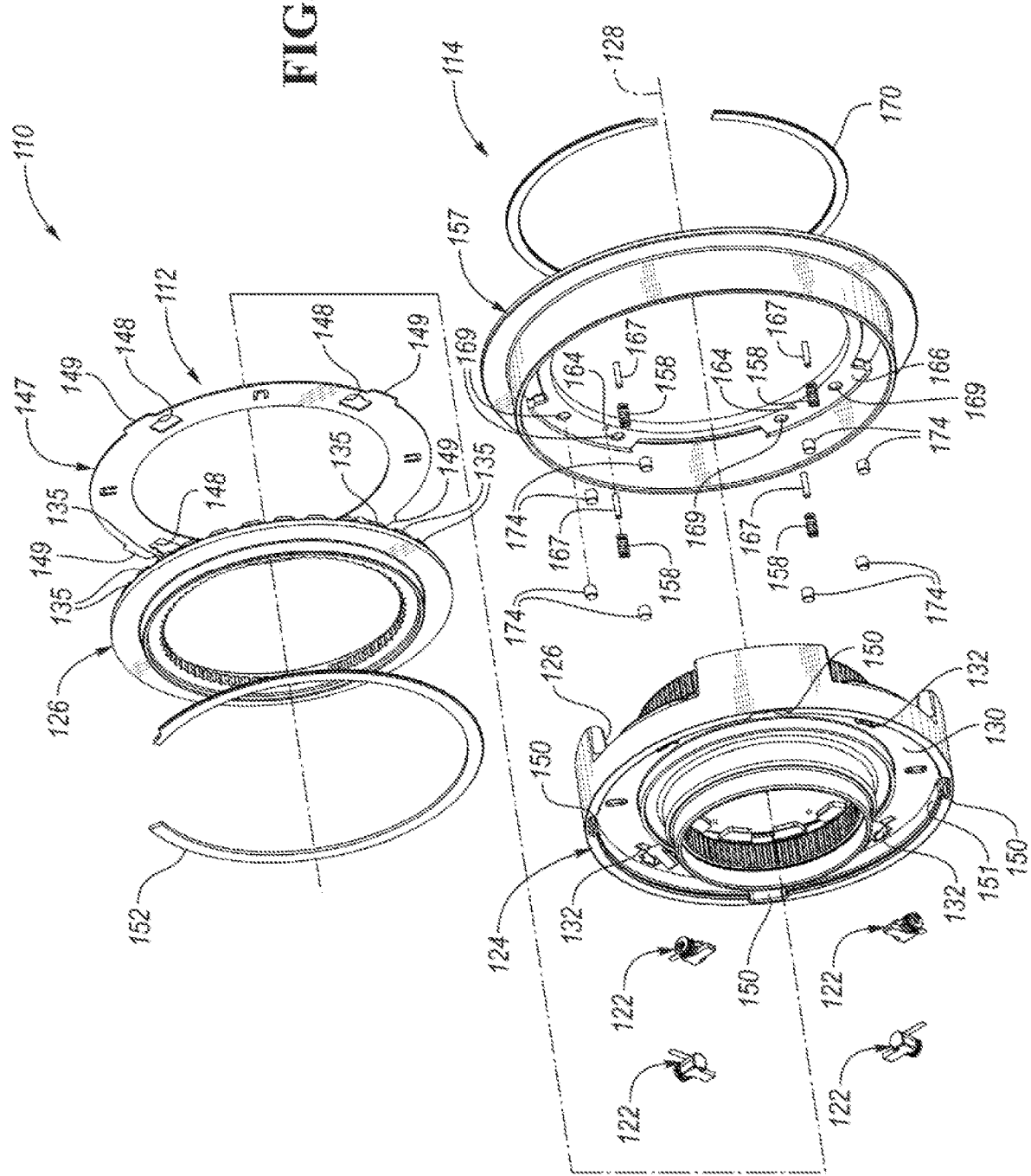
FIG. 11 is an exploded perspective view of the assembly of the second embodiment.

The support member 157 has a plurality of spaced apertures 164 formed on its inner end face or surface 166 which receive and retain posts or pins 167 which, in turn, operatively connect the springs 158 to the support member 157. The support member 157 also supports a plurality of circumferentially spaced button magnets 174 received and retained in apertures 169 (which extend completely through the support member 157 from its face 166 to its face 159) to magnetically hold the support member 157 and the pocket plate 124 together in a second position of the support member 157 (as shown in FIG. 8) which corresponds to a second mode of the assembly 110. A plurality of portions of the pocket plate 124 have a high relative magnetic permeability to provide a holding force with the magnets 174 in engagement therewith. The permeability is greater than 1 and may be greater than 10,000. Preferably, the entire pocket plate 124 has this high relative magnetic permeability and may be made of a ferromagnetic material. The pocket plate 124 may be made of soft magnetic sintered material.

Figure 9:
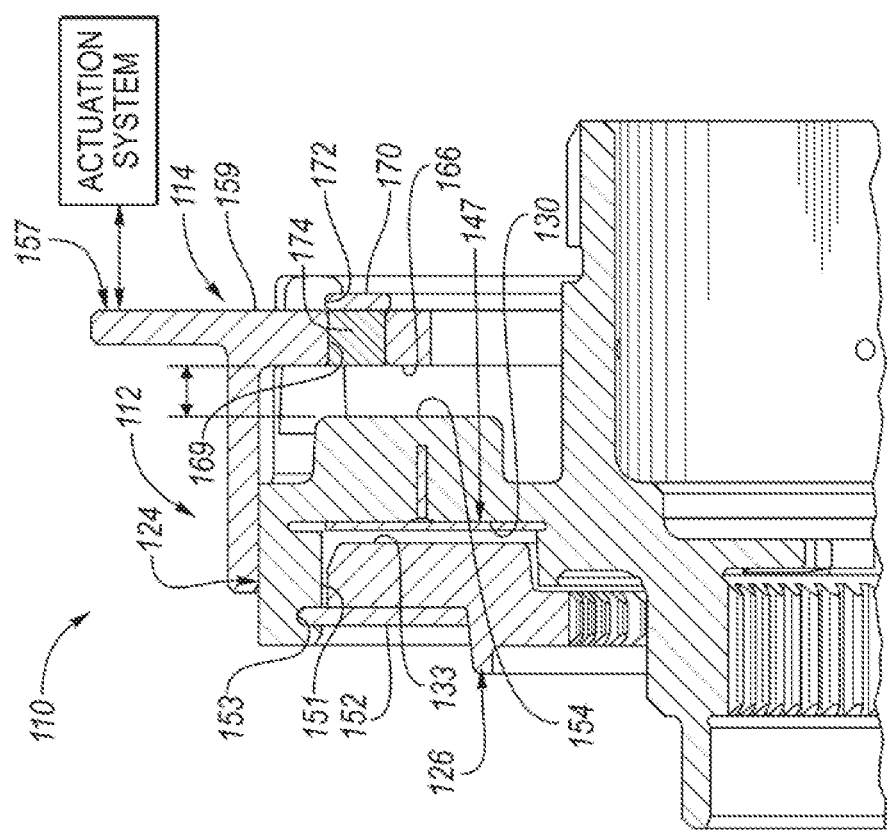
FIG. 9 is a view, similar to the view of FIG. 8, but with the support member in a different latched position in which the locking members are in their uncoupling positions.

The assembly 110 also includes a snap ring 170 which is disposed in a groove 172 formed in an inner axial surface 136 of the pocket plate 124 to hold the support member 157 within the pocket plate 124. In this embodiment, the snap ring or retaining structure 170 also has a plurality of portions which have high relative magnetic permeability to provide a holding force with the magnets 174 in engagement therewith. Preferably, the entire snap ring 170 has this high relative magnetic permeability to hold the support member 157 and the snap ring 170 together in a first position of support member 157 (as shown in FIG. 9) which corresponds to a first uncoupling mode of the assembly 110.

In view of the above, the assembly 110 includes a permanent magnet latch mechanism to hold the assembly 110 in its "on" position (i.e. FIG. 8) and its "off" position (i.e. FIG. 9) without using any energy. The latch mechanism is external to the actuation system. The latch mechanism includes the relatively small, cheap button magnets 174 inserted and retained within the apertures 169 in the support member 157 which thereby provide a permanent magnetic latch between the plate 124 and the support member 157 in one position of the support member 157 (i.e. FIG. 8) and between the ring 170 and the support member 157 in a second position (i.e. FIG. 9). When held together by the magnets 174, the support member 157 rotates either with the pocket plate 124 (i.e. no relative rotation) or with the ring 170. Preferably, the magnets 174 are in physical contact with either the pocket plate 124 or the snap ring 170 in the two latch states (i.e. when the magnetic latch has its greatest strength).

The magnetic latch mechanism of the assembly 110 allows for lower energy usage which means better vehicle efficiencies, less damage/wear to the components and better NVH (i.e. noise, vibration, and harshness). The button magnets 174 are relatively cheap.

Other technical advantages will be readily apparent to one skilled in the art from the following figures, descriptions and claims. Moreover, while specific advantages have been enumerated, various embodiments may include all, some or none of the enumerated advantages.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling and control assembly comprising:
    first and second coupling members supported for rotation relative to one another about a common rotational axis, the first and second coupling members including coupling first and second faces, respectively, in close-spaced opposition with one another, the second coupling member having a third face spaced from the second face, the second face having a pocket, the first face having a set of locking formations and the third face having a passage in communication with the pocket;
    a locking member received within the pocket in an uncoupling position and pivoting outwardly from the pocket to a coupling position in engagement with one of the locking formations; the locking member controlling the operating mode of the assembly, the passage communicating an actuating force to actuate the locking member within the pocket so that the locking member moves between the coupling and the uncoupling positions;
    an actuator received within the passage to provide the actuating force;
    a support member to support the actuator and being mounted for controlled shifting movement relative to the second coupling member between a first position that corresponds to a first mode of the assembly and a second position which corresponds to a second mode of the assembly; and
    a latching mechanism to hold the support member and the second coupling member together in the second position so that the support member and the second coupling member rotate together without using any energy.

2. The assembly as claimed in claim 1, wherein the latching mechanism holds the support member in the first position.

3. The assembly as claimed in claim 1, further comprising at least one biasing member to exert a biasing force on the support member wherein a control force is applied to the support member to cause the support member to move from its first position to its second position against the biasing force of the at least one biasing member and wherein, in the absence of the control force, the at least one biasing member moves the support member from its second position back to its first position.

4. The assembly as claimed in claim 1, wherein the latching mechanism is a magnetic latching mechanism.

5. The assembly as claimed in claim 4, wherein the magnetic latching mechanism is located between the second coupling member and the support member.

6. The assembly as claimed in claim 4, wherein the magnetic latching mechanism includes a first set of permanent magnets supported on the support member to move therewith and a second set of permanent magnets supported on the second coupling member to move therewith, the first and second sets of magnets holding the support member and the second coupling member together in the second position.

7. The assembly as claimed in claim 4, wherein the magnetic latching mechanism includes a set of permanent magnets and wherein at least portions of the second coupling member have a relative magnetic permeability greater than 1, the set of magnets and the portions of the second coupling member holding the support member and the second coupling member together in the second position.

8. The assembly as claimed in claim 7, further comprising a generally round retaining structure that is received by an annular groove in one of the coupling members to retain the assembly together while allowing the shifting movement of the support member and wherein at least portions of the retaining structure have a relative magnetic permeability greater than 1, the set of magnets and the portions of the retaining structure holding the retaining structure and the second coupling member together in the first position.

9. The assembly as claimed in claim 8, wherein the retaining structure comprises a snap ring.

10. The assembly as claimed in claim 7, wherein at least one of the portions of the second coupling member comprises one or more ferromagnetic materials.

11. The assembly as claimed in claim 7, wherein at least one of the portions of the second coupling member comprises one or more ferromagnetic materials wherein at least one of the portions of the second coupling member comprises one or more soft magnetic sintered materials.

12. The assembly as claimed in claim 7, wherein the relative magnetic permeability is greater than 10.

13. The assembly as claimed in claim 7, wherein the relative magnetic permeability is greater than about 100.

14. The assembly as claimed in claim 7, wherein the relative magnetic permeability is greater than about 1,000.

15. The assembly as claimed in claim 7, wherein the relative magnetic permeability is greater than about 10,000.

16. The assembly as claimed in claim 1, wherein the first and third faces are oriented to face axially in a first direction along the rotational axis and the second face is oriented to face axially in a second direction opposite the first direction along the rotational axis.

17. The assembly as claimed in claim 1, wherein the locking member is a locking strut which prevents relative rotation of the first and second coupling members with respect to each other in at least one direction about the rotational axis.

18. The assembly as claimed in claim 1, further comprising a biasing member that biases the locking member against pivotal motion of the locking member towards the coupling position wherein the actuation force pivots the locking member against the bias of the biasing member.

19. The assembly as claimed in claim 1, wherein the first, second and third faces are generally annular and generally extend radially with respect to the rotational axis.

20. The assembly as claimed in claim 1, wherein the locking member is seesaw-shaped.

21. The assembly as claimed in claim 1, wherein the actuator is a spring actuator.

22. The assembly as claimed in claim 1, wherein the support member comprises an apply plate, the first coupling member comprises a notch plate and the second coupling member comprises a pocket plate.

23. A coupling and control assembly comprising:
first and second coupling members supported for rotation relative to one another about a common rotational axis, the first and second coupling members including coupling first and second faces, respectively, in close-spaced opposition with one another, the second coupling member having a third face spaced from the second face, the second face having a plurality of pockets, the first face having a set of locking formations and the third face having a plurality of passages in communication with their respective pockets;
a locking member received within each of the pockets in an uncoupling position and pivoting outwardly from its respective pocket to a coupling position in engagement with one of the locking formations; the locking members controlling the operating mode of the assembly, the passages communicating actuating forces to actuate their respective locking members within the pockets so that the locking members move between their coupling and the uncoupling positions;
an actuator received within each of the passages to provide the actuating forces;
a support member to support the actuators and being mounted for controlled shifting movement relative to the second coupling member between a first position that corresponds to a first mode of the assembly and a second position which corresponds to a second mode of the assembly; and
a latching mechanism to hold the support member and the second coupling member together in the second position so that the support member and the second coupling member rotate together without using any energy.

24. The assembly as claimed in claim 23, wherein the latching mechanism holds the support member in the first position.

25. The assembly as claimed in claim 23, further comprising a plurality of biasing members to exert biasing forces on the support member wherein a control force is applied to the support member to cause the support member to move from its first position to its second position against the biasing forces of the biasing members and wherein, is the absence of the control force, the biasing members move the support member from its second position back to its first position.

26. The assembly as claimed in claim 23, wherein the latching mechanism is a magnetic latching mechanism.

27. The assembly as claimed in claim 26, wherein the latching mechanism is located between the second coupling member and the support member.

28. The assembly as claimed in claim 26, wherein the magnetic latching mechanism includes a first set of permanent magnets supported on the support member to move therewith and a second set of permanent magnets supported on the second coupling members to move therewith, the first and second sets of magnets holding the support member and the second coupling member together in the second position.

29. The assembly as claimed in claim 26, wherein the magnetic latching mechanism includes a set of permanent magnets and wherein at least portions of the second coupling member have a relative magnetic permeability greater than 1, the set of magnets and the portions of the second coupling member holding the support member and the second coupling member together in the second position.

30. The assembly as claimed in claim 29, further comprising a generally round retaining structure that is received by an annular groove in one of the coupling members to retain the assembly together while allowing the shifting movement of the support member and wherein at least portions of the retaining structure have a relative magnetic permeability greater than 1, the set of magnets and the portions of the retaining structure holding the retaining structure and the second coupling member together in the first position.

31. The assembly as claimed in claim 30, wherein the retaining structure comprises a snap ring.

32. The assembly as claimed in claim 29, wherein at least one of the portions of the second coupling member comprises one or more ferromagnetic materials.

33. The assembly as claimed in claim 29, wherein at least one of the portions of the second coupling member comprises one or more ferromagnetic materials wherein at least one of the portions of the second coupling member comprises one or more soft magnetic sintered materials.

34. The assembly as claimed in claim 29, wherein the relative magnetic permeability is greater than 10.

35. The assembly as claimed in claim 29, wherein the relative magnetic permeability is greater than about 100.

36. The assembly as claimed in claim 29, wherein the relative magnetic permeability is greater than about 1,000.

37. The assembly as claimed in claim 29, wherein the relative magnetic permeability is greater than about 10,000.

38. The assembly as claimed in claim 23, wherein the first and third faces are oriented to face axially in a first direction along the rotational axis and the second face is oriented to face axially in a second direction opposite the first direction along the rotational axis.

39. The assembly as claimed in claim 23, wherein the locking members are locking struts which prevent relative rotation of the first and second coupling members with respect to each other in at least one direction about the rotational axis.

40. The assembly as claimed in claim 23, further comprising a plurality of biasing members that bias the locking members against pivotal motion of the locking members towards their coupling positions wherein the actuating forces pivot the locking members against the bias of the biasing members.

41. The assembly as claimed in claim 23, wherein the first, second and third faces are generally annular and generally extend radially with respect to the rotational axis.

42. The assembly as claimed in claim 23, wherein the locking members are seesaw-shaped.

43. The assembly as claimed in claim 23, wherein the actuators are spring actuators.

44. The assembly as claimed in claim 23, wherein the support member comprises an apply plate, the first coupling member comprises a notch plate and the second coupling member comprises a pocket plate.

\* \* \* \* \*